United States Patent [19]
Mathieu et al.

[11] Patent Number: 5,396,232
[45] Date of Patent: Mar. 7, 1995

[54] TRANSMITTER DEVICE WITH TWO INSULATING COUPLINGS FOR USE IN A BOREHOLE

[75] Inventors: Yves M. G. Mathieu, Les Ulis; Jean-Luc R. A. L. DeCorps, Antony; Didier Fouillou, Fontainebleau; Jean-Marie Revel, Bombon, all of France

[73] Assignee: Schlumberger Technology Corporation, Houston, Tex.

[21] Appl. No.: 133,694

[22] Filed: Oct. 7, 1993

[30] Foreign Application Priority Data

Oct. 16, 1992 [FR] France .................. 92 12397

[51] Int. Cl.$^6$ ........................... G01V 1/00
[52] U.S. Cl. .................. 340/854.5; 340/854.6; 175/40; 166/250
[58] Field of Search ........... 340/854.8, 854.4, 854.6, 340/855.1; 175/40; 166/250

[56] References Cited

U.S. PATENT DOCUMENTS

| | | | |
|---|---|---|---|
| 2,364,957 | 12/1944 | Douglass | 175/182 |
| 2,389,241 | 11/1945 | Silverman | 340/854.6 |
| 2,400,170 | 5/1946 | Silverman | 340/854.6 |
| 3,079,549 | 2/1963 | Martin | 324/1 |
| 4,015,234 | 3/1977 | Krebs | 340/854.5 |
| 4,356,629 | 11/1982 | Jeter et al. | 29/885 |
| 4,494,072 | 1/1985 | Jeter et al. | 340/854.5 |
| 4,684,946 | 8/1987 | Issenmann | 340/854.5 |
| 4,766,442 | 8/1988 | Issenmann | 343/719 |
| 5,138,313 | 8/1992 | Barrington | 340/854.6 |
| 5,163,714 | 11/1992 | Issenmann | 285/54 |

FOREIGN PATENT DOCUMENTS

| | | | |
|---|---|---|---|
| 2562601 | 10/1985 | France | E21B 47/12 |
| 2600171 | 12/1987 | France | G01V 1/16 |
| 2635819 | 3/1990 | France | E21B 17/08 |
| 2416063 | 10/1975 | Germany | E21B 47/12 |

*Primary Examiner*—J. Woodrow Eldred
*Attorney, Agent, or Firm*—Henry N. Garrana; John H. Bouchard

[57] ABSTRACT

In order to enable information such as the results of physical measurements performed downhole in an oil well during testing or production to be transmitted in real time to a receiver on the surface, the bottom portion of a tubular string (12) is fitted with a transmitter device that transmits an electromagnetic wave which is conveyed to the receiver on the surface by the ground surrounding the well. The transmitter device includes a power source (32) disposed in an annular cavity (34) formed at an intermediate level between an outer insulating coupling (36) and an inner insulating coupling (38). The power source (32) is electrically connected between two tubular walls (39, 40) delimiting the cavity (34) so as to apply a modulated alternating electrical signal directly to said walls.

13 Claims, 2 Drawing Sheets

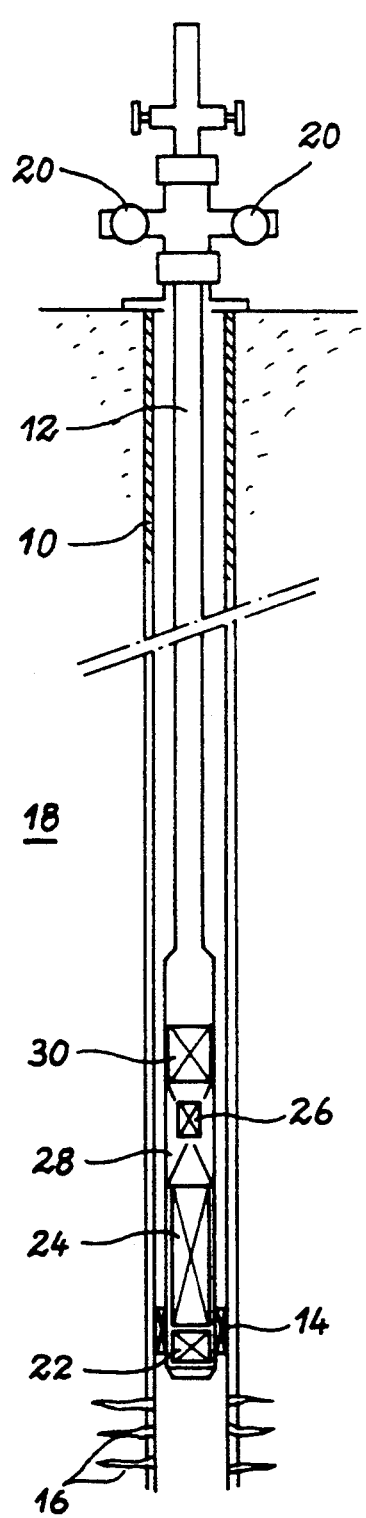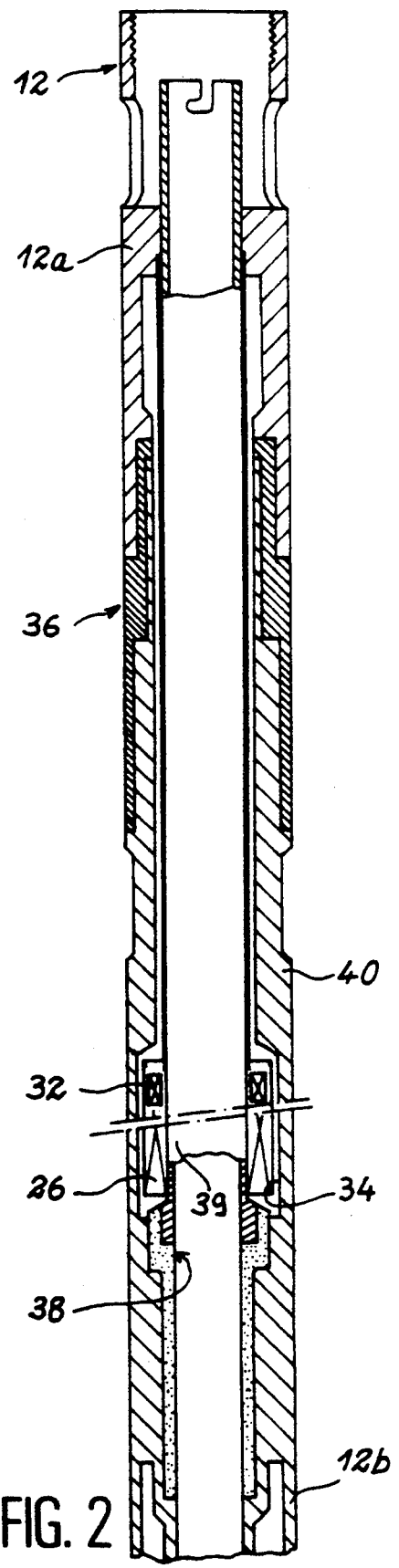

TRANSMITTER DEVICE WITH TWO INSULATING COUPLINGS FOR USE IN A BOREHOLE

BACKGROUND OF THE INVENTION

1. Field of the Invention

The invention relates to a transmitter device with two insulating couplings, and designed to be mounted on a tubular string in a borehole such as an oil well during testing or production, for the purpose of transmitting information to a receiver on the surface.

2. Background of Invention

While an oil well is being drilled, use is frequently made of a wireless technique of transmitting information, which technique consists in using the fluid that then fills the well to transmit hydraulic pressure waves conveying said information. However, that technique of transmitting information is not applicable to a well while it is being tested or is in production.

Document U.S. Pat. No. 2,400,170 shows that proposals have been made for many years to convey information from down a borehole up to the surface by using an electromagnetic wave which is modulated as a function of the information to be conveyed. To this end, an electrical signal is applied between two lengths of a tubular metal string placed in the borehole on opposite sides of an insulating coupling mounted in the string.

Document FR-A-2 618 912 describes an insulating coupling suitable for a practical application to a well that is being drilled of the technique of conveying information in the form of electromagnetic waves. The insulating coupling includes a ceramic coating that is interposed between complementary cylindrical threads formed on two lengths of the tubular string. Further insulation is obtained by an internal insulating coating and by external insulating coating providing continuous electrical insulation with the ceramic coating. These two insulating coatings overlie the inside and outside surfaces of the tubular string over a certain length from the insulating coupling.

Nevertheless, the insulating coupling described in document FR-A-2 618 912 which was designed for use in a well while the well is being drilled, is not adapted to transmitting information in a well that is under test or that is in production.

Thus, the annular string or tubing in a well that is being tested or that is in production must have a central bore that is completely free, in order to enable a specific apparatus for the purpose of to be subsequently inserted therethrough. With an insulating coupling such as that described in document FR-A-2 618 912, this requirement is incompatible with the dimensions that need to be given in practice to the conductors that are used for applying a modulated alternating electrical signal to opposite sides of the coupling.

Assuming, for example, that the power source used for emitting the electrical signal is placed below the sealed coupling, it becomes practically impossible for the sealed coupling to have electrical conductors connected to the length of string situated above the coupling by passing through the coupling without unacceptably reducing the mechanical strength of the production string at this location, given the large section required of the conductors because of the power they need to convey above the coupling in order to ensure that a usable signal is received at the surface.

In addition, the sealed coupling described in document FR-A-2 618 912 has a structure that makes it possible to provide good electrical insulation between the portions of the drilling string situated above and below the coupling, but which is not suitable for withstanding the high pressure difference (up to $10^8$ Pa) that may exist between the inside and the outside of the annular string in a well being tested or in production.

A particular object of the invention is to provide a novel type of transmitter device suitable for being mounted in a test or production string in an oil well, enabling a relatively high power modulated alternating electrical signal to be applied between two lengths of the string that are electrically insulated from each other.

Another object of the invention is to provide a transmitter apparatus enabling the central bore of the string to be left completely free.

A further object of the invention is to provide a device capable of withstanding the large pressure differences that may exist between the inside and the outside of the string without causing the string to lose its sealing properties.

SUMMARY OF THE INVENTION

According to the invention, a transmitter device suitable for mounting in a tubular string in a borehole for electromagnetic wave transmission comprises a power source suitable for producing an electrical signal for transmission, said source being placed in an annular cavity formed in the string between an outer insulating coupling and an inner insulating coupling that are offset on either side of the power source in the longitudinal direction of the production string, the power source being electrically connected between an inner tubular wall and an outer tubular wall of the string that define said cavity.

By using two insulating couplings that are offset axially and radially, and by placing the power source axially between said two couplings, it becomes possible to provide the electrical connection between the power source and the length of production string situated above and below the device directly without using electrical conductors of large section.

In addition, by avoiding the use of electrical conductors, this disposition makes it possible to limit as much as possible losses of power between the source which transmits the signals and the lengths of the string that are electrically insulated relative to each other.

In a preferred embodiment of the invention, the outer insulating coupling and the inner insulating coupling are situated respectively above and below the power source. In practice, the outer insulating coupling may be designed so as to transfer forces in rotation and in translation, and also so as to transfer both shocks and forces in rotation and translation along the string, whereas the inner insulating coupling withstands only those forces that are due to pressure.

BRIEF DESCRIPTION OF THE DRAWINGS

A preferred embodiment of the invention is described below by way of non-limiting example and with reference to the accompanying drawings, in which:

FIG. 1 is a diagrammatic vertical section view through an oil well having a production string placed therein and carrying a transmitter device of the invention at its bottom end;

FIG. 2 is a diagrammatic vertical section view on a larger scale showing the transmitter device placed at the bottom of the production string.

DESCRIPTION OF THE PREFERRED EMBODIMENTS

Figure 3:
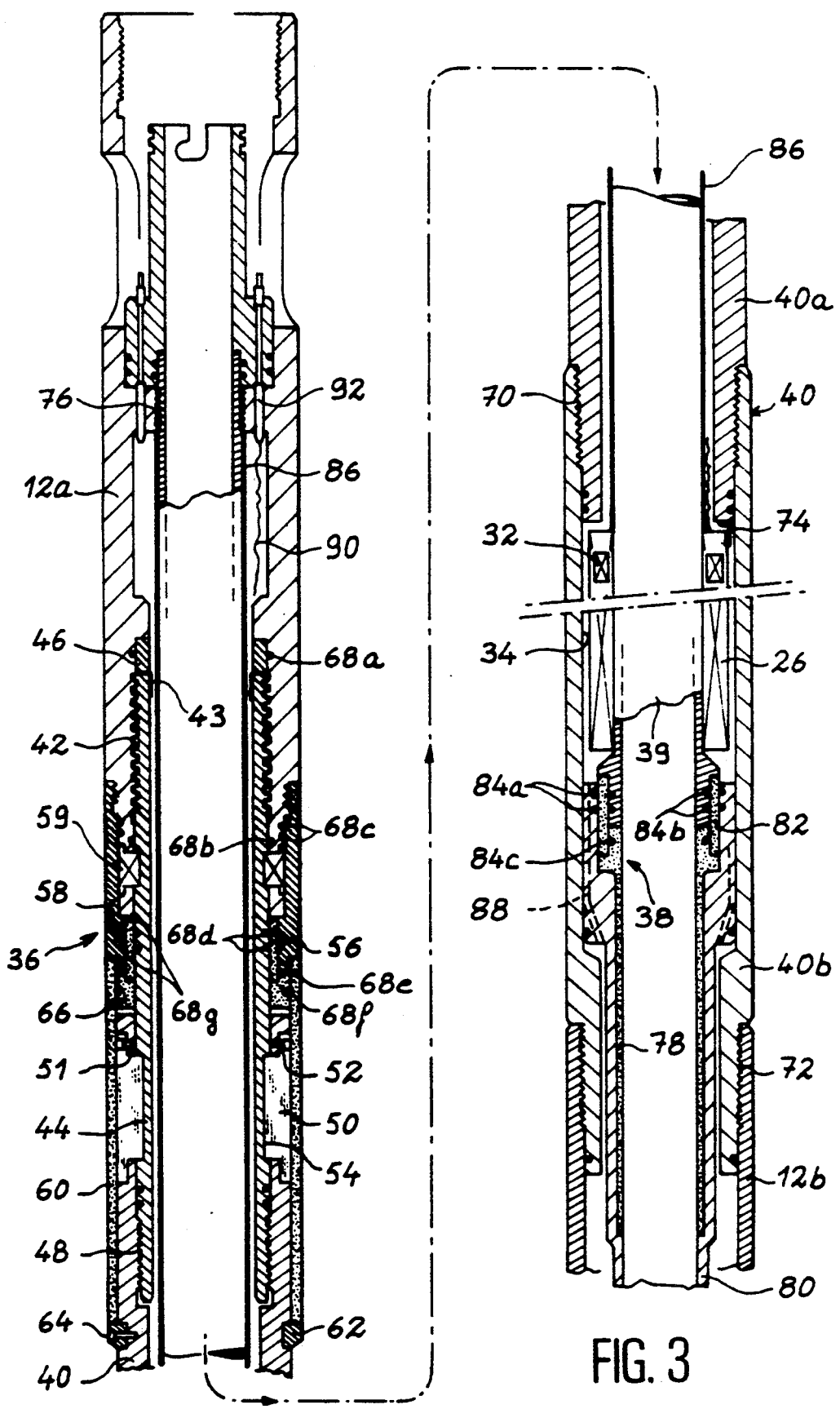
FIG. 3 is a vertical section view on a larger scale showing the transmitter device of the invention in detail.

FIG. 1 is a highly diagrammatic representation of an oil well comprising a casing 10 with a test or production string or "tubing" 12 placed inside the casing. An annular sealing device 14 is placed between the bottom end of the production string 12 and the casing 10. Perforations 16 through the casing 10 beneath the annular sealing device 14 enable a petroleum fluid to enter the well from a natural reservoir located in the subsurface formations 18 traversed by the well. When the well is in production, this petroleum fluid flows up the production string 12 to the surface where it is collected by pipework under the control of valves 20.

Measuring devices, represented diagrammatically at 22, are permanently mounted at the bottom of the production string 12. These devices 22 measure physical magnitudes such as pressure and temperature. A module containing a storage battery, represented diagrammatically by 24, is located close to the measuring devices 22, e.g. immediately above them. The batteries are suitable for supplying the electrical energy required by the devices 22 and by other apparatuses placed at the bottom of the production string 12. Thus, the storage battery module 24 also serves to provide electricity to an electronics cartridge 26 placed in a transmitter device 28, e.g. situated immediately above the storage battery module 24. Other apparatuses such as a valve 30 suitable for closing the bottom end of the production string 12 are placed at the bottom thereof, above the transmitter device 28. The valve 30 is opened and closed under the control of the electronics cartridge 26.

In the arrangement shown very diagrammatically in FIG. 1, it should be observed that the various devices that are placed at the bottom of the production string 12 are, in practice, annular in shape so as to leave free an axial bore of uniform diameter up the entire height of the production string. This passage allows petroleum fluid to flow freely and also makes it possible, when necessary, to lower instrumentation and/or auxiliary measurement systems suspended on a cable.

A preferred embodiment of the transmitter device 28 is described in greater detail with reference to FIGS. 2 and 3, in that order. In accordance with the invention, the purpose of this device is to transmit an electromagnetic wave in the form of a sinusoidal electrical signal which is modulated in such a manner as to convey information corresponding to the results of measurements performed by the measuring devices 22. The modulated alternating electrical signal is delivered in real time by a power source 32 located in the electronics cartridge 26. It is applied between two consecutive lengths 12a and 12b of the production string 12 which are electrically insulated from each other. These two consecutive lengths 12a and 12b are made of an electrically conductive material and they form a transmitter antenna from which a modulated electromagnetic wave propagates through the ground 18 (FIG. 1) surrounding the well. Receivers (not shown) placed on the surface detect the modulated electromagnetic wave. The signals picked up by the receivers are then demodulated in order to extract information relating to the results of the measurements performed downhole by the devices 22, for example values of pressure and of temperature. It is thus possible to obtain the results of various measurements in real time.

In accordance with the invention and as shown diagrammatically in FIG. 2, the electronics cartridge 26 which contains the power source 32 is placed in an annular cavity 34 formed in the bottom of the production string 12 between an outer insulating coupling 36 and an inner insulating coupling 38 which are respectively offset upwards and downwards relative to the electronics cartridge 26. More precisely, the annular cavity 34 is radially defined between an inner tubular wall 39 mechanically and electrically connected to an upper length 12a of the production string 12 situated above the outer insulating coupling 36, and an outer tubular wall 40 mechanically and electrically connected to a lower length 12b of the production string 12 situated beneath the inner insulating coupling 38.

The above-described disposition makes it possible to connect the power source 32 contained in the electronics cartridge 26 directly between the inner tubular wall 38 and the outer tubular wall 40, thus enabling the modulated sinusoidal electrical signal emitted by the power source 32 to be applied between the lengths 12a and 12b of the production string 12 without it being necessary to pass electrical conductors through either of the insulating couplings 36 and 38. This disposition thus makes it possible to limit electrical power losses as much as possible by applying the electrical signals practically directly to the metal parts concerned, without there being any need for said signals to transit via electrical conductors that inevitably give rise to significant losses.

A more detailed description of the structure of the transmitter device is given below with reference to FIG. 3 which shows the preferred embodiment of said device.

The outer insulating coupling 36 firstly includes a thread 42 formed between the upper length 12a of the production string 12 and an intermediate linking tube 44. More precisely, the thread 42 corresponds to cooperation between a threaded portion formed in the bottom portion of the upper length 12a of the production string and a thread formed at the top end of the intermediate linking tube 44. The thread 42 is coated with an electrically insulating material 43 such as alumina which is deposited over a thickness of about 0.1 mm using a detonation gun. This electrically insulating material also covers all of the top face of the intermediate linking tube 44 extending to the inside of said tube, and all of the outside surface of the tube 44 all the way to the bottom face of the upper length 12a of the production string.

As shown in FIG. 3, a metal friction ring 46 is locked between the top surface of the intermediate linking tube 44 which is covered with the electrically insulating material, and a facing shoulder formed on the upper length 12a of the production string. This friction ring 46 is constrained to rotate with the intermediate linking tube 44 by any appropriate means (not shown). When the intermediate linking tube 44 is screwed into the bottom portion of the upper length 12a of the production column, this disposition makes it possible to prevent the electrically insulating material 43 coating the top face of the tube 44 being destroyed under the effect of the friction that inevitably arises between the top face of said tube and the upper length 12a if the friction ring 46 is not present.

The intermediate linking tube 44 is advantageously installed in the bottom portion of the upper length 12a of the production string in a workshop, so that the torque applied to the thread 42 can be controlled accurately so as to ensure that a rigid mechanical connection is provided that is capable of transferring both rotary and translation forces along the production string. The tightening torque is also controlled so as to avoid damaging the electrically insulating material that covers the thread 42 during said operation.

At its bottom end, the intermediate linking tube 44 has a thread 48 which co-operates with the top end of the outer tubular wall 44 that delimits the inside of the annular cavity 34. More precisely, the thread 48 corresponds to a threaded portion formed in the top portion of the outer tubular wall 40 cooperating with a thread formed on the bottom portion of the intermediate linking tube 44. The thread 48 is tightened on site in the well and serves to transmit translation forces along the production string 12.

Rotary forces are transmitted between the intermediate linking tube 44 and the outer tubular wall 40 by keys 50 adapted to be received in suitable recesses 51 formed in the top portion of the outer tubular wall 40 above the thread 48. These keys 50 are secured in the recesses 51, e.g. by means of screws 52. They then project into longitudinal slots 54 formed in the outer surface of the intermediate linking tube 44 above the thread 48 in order to achieve the desired rotary connection.

In addition to the thread 42 covered with its electrically insulating material 43, the outer insulating coupling 36 includes a first intermediate ring 56 that is electrically insulating and whose top face sealingly engages the bottom face of the upper length 12a of the production string and whose inner surface sealingly engages the outer surface of the intermediate linking tube 44 in a portion of said tube which is situated immediately below the thread 42 and which is partially covered by the electrically insulating material 43. This first intermediate ring 56 is made of an electrically insulating material such as a ceramic.

A bush 58 is screwed onto the bottom portion of the upper length 12a of the production string. The bottom portion of the bush 58 is a close fit over the major portion of the first intermediate ring 56, with the exception of its bottom end. In its central portion that surrounds the bottom end of the upper length 12a, the bush 58 holds in place the keys 59 housed in said bottom end, such that the keys project into longitudinal grooves formed in the outside surface of the intermediate linking tube 44. The tube 44 is thus prevented from rotating relative to the upper length 12a.

The outer insulating coupling 36 also includes an outer sleeve 60 likewise made of an electrically insulating material, e.g. an epoxy resin. This outer sleeve 60 surrounds the upper portion of the outer tubular wall 40 in a region that contains the thread 48 and the keys 50. The top end of the outer sleeve 60 comes into abutment against the fixing bush 58 whereas its bottom end bears against a two-part collar 62 fixed on the outer tubular wall 40, e.g. by means of screws 64.

In the embodiment shown in FIG. 3, the tubular wall 40 that defines the outside of the annular cavity 34 is constituted by an upper portion 40a and a lower portion 40b which are screwed together via a thread 70. It is thus the top face of the lower portion 40b that delimits the downwards clearance available to the outer sleeve 60 when the two-portion collar 62 is not in place.

The lower portion 40b of the outer tubular wall 40 is screwed by a thread 72 into the lower length 12b of the production string, situated immediately below the transmitter device 28.

Because of this disposition, it is possible to remove the outer sleeve 60 in order to replace it, e.g. if damaged. To do this, it suffices to undo the collar 62, thereby enabling the sleeve 60 to be slid downwards. The outer sleeve 60 can then be removed after unscrewing the lower length 12b of the string, and then the lower portion 40b of the outer tubular wall 40.

Because the outer sleeve 60 and the first intermediate ring 56 can be removed, these two parts are not put into direct contact when they are in place. To provide sealing between these two parts, the outer insulating coupling 36 further includes a second intermediate ring 66 which is in sealing contact both with the outer surface of the first intermediate ring 56 in a portion thereof that projects below the fixing bush 58, and with the inner surface of the outer sleeve 60 in the top portion thereof adjacent to the fixing bush 58. Like the first intermediate ring 56, the second intermediate ring 66 is made of an electrically insulating material such as PEEK. This second intermediate ring 66 may be installed before the outer tubular wall 40 carrying the outer sleeve 60 which is not yet locked in place by the two part collar 62 is itself screwed to the lower end of the inner linking tube 44 which is already secured to the upper length 12a of the production string by the thread 42.

The outer insulating coupling 36 as described above provides complete electrical insulation between the upper length 12a and the inner linking tube which is electrically connected to the lower length 12b via the outer tubular wall 40. This electrical insulation is essential for proper operation of the transmitter antenna incorporated in the transmitter device 28 (FIG. 1) when said antenna receives a modulated alternating electrical signal from the power source 32. In particular, the length of the outer sleeve 60 is designed so as to ensure that there is no short circuit under any circumstances through the fluid between the upper length 12a of the production string and the outer tubular wall 40.

In order to ensure that the electrically insulating property of the outer insulating coupling 36 is retained under all circumstances, and in spite of the presence of fluid inside and outside the production string, and in spite of the high pressure difference (up to $10^8$ Pa) that may exist between said fluids, the coupling 36 is also fitted with a certain number of O-ring seals that prevent any risk of direct contact between these two fluids at any pressure up to a pressure greater than said maximum value. These seals comprise:

- a first O-ring 68a mounted in the length 12a so as to be in sealing contact with the outer surface of the friction ring 46;
- a second O-ring 68b mounted in the upper length 12a so as to be in sealing contact with the electrically insulating coating 43 carried by the inner linking tube 44 immediately below the thread 42;
- two O-rings 68c mounted around the bottom end of the upper length 12a of the production string so as to be in sealing contact with the inner surface of the fixing bush 58;
- two O-rings 68d mounted on the intermediate linking tube 44 so as to be in sealing contact with the inner surface of the first intermediate ring 56;

an O-ring 68e mounted in the second intermediate ring 66 so as to be in sealing contact with the outer surface of the first intermediate ring 56 below the fixing bush 58;

an O-ring 68f mounted on the second intermediate ring 66 so as to be in sealing contact with the lower surface of the outer sleeve 60, in the upper portion thereof; and two O-rings 68g mounted in the fixing bush 58 so as to be in sealing contact with the outer surface of the first intermediate ring 56.

It should be observed that the various mechanical connections successively interconnecting the upper length 12a to the intermediate linking tube 44, the tube 44 to the upper portion 40a, said portion 40a to the lower portion 40b, and the lower portion 40b to the lower length 12b together define a rigid mechanical assembly capable of transferring forces both in rotation and in translation along the production string. This mechanical connection makes it possible to ensure that forces generated while installing the production string 12 do not lead to some of the parts mounted at the bottom end of the string being accidentally disconnected or broken off.

As shown more particularly in the righthand portion of FIG. 3, the electronics cartridge 26 containing the power source 32 is housed in the portion of the annular cavity 34 that is situated beneath the lower end face of the upper portion 40a of the outer tubular portion 40. This disposition makes it possible to provide a direct connection between the positive terminal of the power source 32 and the bottom face of the portion 40a via an electrically conductive braid 74 that is very short.

In addition, the annular electronics cartridge 26 is fixed directly against the inner tubular wall 39 on which the negative terminal of the power source 32 is electrically connected.

The above-described disposition makes it possible to apply to the transmitting antenna of the transmitter device 28 the modulated alternating electrical signal as delivered by the power source 22 while suffering minimum losses.

The lower tubular wall 39 extends upwards from the electronics cartridge 26 to beyond the outer insulating coupling 36, such that its top end is mechanically connected by a thread 76 to the upper length 12a of the production string. A direct electrical connection is thus established between the negative terminal of the power source 32 and the upper length 12a, while the positive terminal of the power source 32 is connected to the lower length 12b of the production string via the braid 74 and the outer tubular wall 40.

The inner insulating coupling 38 is interposed between the bottom end of the inner tubular wall 39 and the lower portion 40b of the outer tubular wall 40 is described in detail below with reference to the righthand portion of FIG. 3.

This inner insulating coupling 38 mainly comprises an inner sleeve 78 which is placed coaxially in line with the inner tubular wall 39, and below it, such that its top end face is in contact with the bottom end face of the wall 39. The inner sleeve 78 is made of an electrically insulating material, preferably identical to that used for the outer sleeve 60, i.e. a material such as an epoxy resin. Its inner diameter is identical to that of the inner tubular wall 39, and it is mounted in a tubular metal part 80 which extends downwards inside the lower length 12b and whose larger-diameter top portion is held captive in the lower portion 12b of the outer tubular wall 40.

It should be observed that the above-described disposition makes it possible to remove the inner sleeve 78 for the purpose of replacing it, by unscrewing the thread 70 and then removing the lower length 12b, the lower portion 40b, and then the lower tubular part 80.

In addition to the inner sleeve 78, the inner insulating coupling 38 includes an intermediate ring 82 made of an electrically insulating material such as a ceramic, which ring surrounds in sealed manner the adjacent ends of the inner tubular wall 39 and of the annular part 80. In addition, the ends of the intermediate ring 82 bear against facing shoulders formed on larger diameter regions of the inner tubular wall 39 and of the inner sleeve 78 such that the ring 82 is held captive axially between these two parts. The outer surface of the intermediate ring 82 also co-operates in sealed manner with the inner surface of the inner tubular part 80, in the top portion thereof.

The inner insulating coupling 38 formed by the inner sleeve 78 and the intermediate ring 82 serves to provide electrical insulation between the inner tubular wall 39 and the lower length 12b of the production string. As for the outer sleeve 60, the inner sleeve 78 extends over a length that is sufficient to ensure that a short circuit cannot take place through the inner fluid directly between the bottom end of the inner tubular wall 39 and the inner tubular part 80.

Furthermore, the sealing contacts between the various parts are designed so that sealing is ensured for pressure differences that may reach high levels, e.g. $10^8$ Pa. To this end, the inner insulating coupling 38 also includes O-ring seals organized as follows:

two O-rings 84a mounted inside the upper portion of the inner tubular part 80 so as to be in sealing contact with the outer surface of the intermediate ring 82;

two O-rings 84b mounted on the lower portion of the inner tubular wall 39 so as to be in sealing contact with the inner surface of the intermediate ring 82; and an O-ring 84c mounted on the upper portion of the inner sleeve 78 so as to be in sealing contact with the inner surface of the intermediate ring 82.

To finish off the description of the transmitter device 28, it can also be seen in FIG. 3 that a layer 86 of electrically insulating material covers the outside of the inner tubular wall 39 over its entire height between the electronics cartridge 26 and the thread 76. This layer 86 which may be made of a plastic such as Viton (registered trademark of Du Pont), serves to prevent any short circuit occurring directly between said inner tubular wall 39 and the parts surrounding it such as the intermediate linking tube 44 and the outer tubular wall 40 which are raised to a different potential when the power source 32 is operated.

FIG. 3 also shows that passages 88 are formed through the inner tubular part 80 so as to allow electrical conductors (not shown) to provide electrical power to the electronics cartridge 26 from the storage battery module 24 (FIG. 1) placed above the transmitter device 28.

In addition, the annular space formed around the inner tubular portion 39 in the upper portion 40a of the outer tubular portion 40 and in the intermediate linking tube 44 allows a certain number of electrical conductors such as 90 to pass for the purpose of electrically connecting portions of the electronics cartridge 26 other than the power source 32 to systems that are controlled electrically, e.g. the valve 30 in FIG. 1, and situated above the transmitter device 28. To this end, electrical conductors such as 90 are connected at the top to terminals 92 which pass through the upper length 76 of the production string around the thread 76.

The above description shows that the original disposition of the power source 32 in an annular cavity 34 formed axially between an outer insulating coupling 36 and an inner insulating coupling 38 makes it possible to apply a high power modulated alternating electrical signal between the upper length 12a and the lower length 12b of a production string, which signal is suitable for generating electromagnetic waves that are conveyed by the ground to a receiver on the surface, without reducing the mechanical strength of the production string at the transmitter device and without hindering in any manner the central passage passing through the production string over its entire height.

Naturally the transmitter device of the invention may be modified relative to the embodiments described without going beyond the ambit of the invention. Thus, the outer insulating coupling could be placed beneath the cavity that receives the power source and the inner insulating coupling could be placed above said cavity, unlike the disposition described with reference to FIGS. 2 and 3. Furthermore, the shapes given to the various elements making up the two insulating couplings, and the electrically insulating materials from which they are made could be different from those described without going beyond the ambit of the invention.

We claim:

1. A transmitter device suitable for mounting in a tubular string in a borehole for the purpose of transmitting an electromagnetic wave so as to convey information, comprising a power source suitable for producing an electrical signal for transmission, said source being placed in an annular cavity formed in the tubular string between an outer insulating coupling and an inner insulating coupling that are offset on either side of the power source in the longitudinal direction of the string, the power source being electrically connected between an inner tubular wall and an outer tubular wall of the string, delimiting said cavity.

2. A device according to claim 1, wherein the outer insulating coupling and the inner insulating coupling are situated respectively above and below the power source.

3. A device according to claim 1, wherein the outer insulating coupling constitutes a rigid mechanical connection enabling rotary and translation forces to be transferred along the production string.

4. A device according to claim 2, wherein the outer insulating coupling constitutes a rigid mechanical connection enabling rotary and translation forces to be transferred along the production string.

5. A device according to claim 3, wherein in the outer insulating coupling includes a thread covered with an electrically insulating material, an electrically insulating outer sleeve, and at least a first electrically insulating intermediate ring in sealing contract with said electrically insulating material and with the outer sleeve.

6. A device according to claim 4, wherein in the outer insulating coupling includes a thread covered with an electrically insulating material, an electrically insulating outer sleeve, and at least a first electrically insulating intermediate ring in sealing contract with said electrically insulating material and with the outer sleeve.

7. A device according to claim 5, wherein the thread is formed between an upper length of the production string and an intermediate linking tube fixed on said tubular wall by a removable link enabling the outer sleeve to be replaced.

8. A device according to claim 6, wherein the thread is formed between an upper length of the production string and an intermediate linking tube fixed on said tubular wall by a removable link enabling the outer sleeve to be replaced.

9. A device according to claim 7, wherein a friction ring constrained to rotate with the intermediate linking tube is interposed between a top end of said tube and the upper length of the production string, the electrically insulating material extending between the friction ring and the intermediate linking tube.

10. A device according to claim 8, wherein a friction ring constrained to rotate with the intermediate linking tube is interposed between a top end of said tube and the upper length of the production string, the electrically insulating material extending between the friction ring and the intermediate linking tube.

11. A device according to claim 1, wherein the inner insulating coupling comprises an electrically insulating inner sleeve and at least one second electrically insulating intermediate ring, in sealing contact with the inner sleeve and with the inner tubular wall.

12. A device according to claim 11, wherein the outer tubular wall is made of two portions connected together by dismountable coupling means so as to enable the inner sleeve to be replaced.

13. A device according to claim 1, wherein the inner tubular wall is covered with an electrically insulating layer between the power source and the top end of the annular cavity.

* * * * *